United States Patent [19]

Dröscher et al.

[11] Patent Number: 4,643,567

[45] Date of Patent: Feb. 17, 1987

[54] DEVICE FOR CONTROLLING THE POSITION OF A TUNNELLING MACHINE

[75] Inventors: Bernhard Dröscher; Alfred Zitz, both of Zeltweg, Austria

[73] Assignee: Voest-Alpine Aktiengesellschaft, Muldenstrasse, Austria

[21] Appl. No.: 621,731

[22] Filed: Jun. 18, 1984

[30] Foreign Application Priority Data

Jun. 24, 1983 [AT] Austria ................................ 2330/83

[51] Int. Cl.⁴ ........................ G01B 11/26; G01C 1/00
[52] U.S. Cl. ......................................... 356/152; 172/2
[58] Field of Search ...................... 356/141, 152, 172

[56] References Cited

U.S. PATENT DOCUMENTS

| | | | |
|---|---|---|---|
| 3,494,699 | 2/1970 | Gloge | 356/152 |
| 3,723,013 | 3/1973 | Stirland et al. | 356/152 |
| 3,906,220 | 9/1975 | Delingat | 356/28 |
| 4,027,210 | 5/1977 | Weber | 356/152 |
| 4,314,761 | 2/1982 | Reymond et al. | 356/152 |

FOREIGN PATENT DOCUMENTS

| | | |
|---|---|---|
| 2427816 | 6/1974 | Fed. Rep. of Germany . |
| 2531759 | 7/1975 | Fed. Rep. of Germany . |
| 2612681 | 3/1976 | Fed. Rep. of Germany . |
| 2622738 | 5/1976 | Fed. Rep. of Germany . |

Primary Examiner—Stephen C. Buczinski
Attorney, Agent, or Firm—Cushman, Darby & Cushman

[57] ABSTRACT

Figure 3:
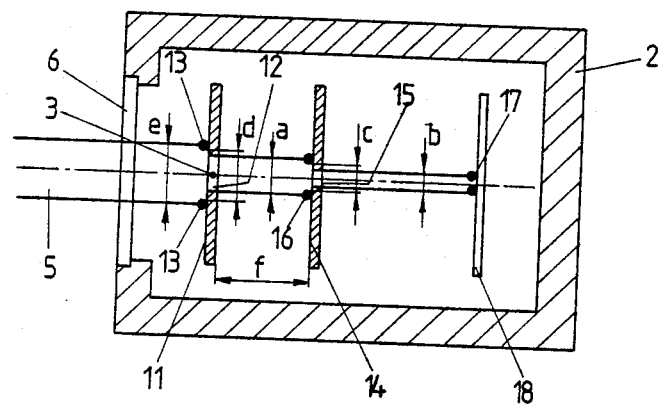

The device for controlling the position of a tunnelling machine has a housing (2) swivelling about an axis (3), within of which three measuring surfaces (11, 14, 18) are arranged. The first two measuring surfaces (11, 14) have openings of passage (12) for a laser beam (5), the clear width (a, c) of which diminishes in the direction of propagation of the laser beam (5). The clear width (a) of the first measuring surface (11) is smaller than the diameter (e) of the striking area of the laser beam in this measuring surface (11). The receiver elements (13, 16, 17) are arranged symmetrically in relation to the axis of the openings of passage or in case of the last measuring surface (18) in the axis and within the normal projection of the edges of the openings of passage of a preceding measuring surface (FIG. 3).

5 Claims, 9 Drawing Figures

DEVICE FOR CONTROLLING THE POSITION OF A TUNNELLING MACHINE

The invention relates to a device for controlling the position of a tunnelling machine in relation to a guide beam, within the measuring surfaces receiver elements for the guide beam being arranged, wherein at least the measuring surface located next to the emitter of the guide beam is transmissive for the passage of the guide beam in at least one opening of passage. Such a device is for instance to be taken from the AT-PS No. 337 128. In this well known embodiment the receiver is mounted adjustably in horizontal and vertical position on a tunneling machine. The receiver device consists of two receiver surfaces arranged one behind the other in direction of propagation of a laser beam, wherein the first surface facing the emitter of the laser beam has a drill hole. On the second receiver surface behind the first a number of light-sensitive elements is arranged. The receiver device is first of all oriented so that the laser beam can pass through the drill hole of the first receiver surface, and the angular deviations and displacements of the tunnelling machine result from its admission to one or several of the light-sensitive elements of the second or posterior receiver surface. Analysis is effected by a calculator and requires several complicated mathematical evaluations. In addition to that at least in the second posterior receiver surface a great number of light-sensitive elements is required, the signals of which must be interpreted separately from each other in order to allow a corresponding distinction of the angular displacement.

The invention aims at simplifying a device as described above and at making it possible to achieve a reliable statement on angular displacements of a tunnelling machine with a relatively low number of sensors and therefore a diminished number of signalling lines. The embodiment according to the invention aims furthermore at diminishing essentially the mathematical effort and at making analysis possible to be effected with simple logical circuits reliable in operation.

In order to solve this problem the invention consists essentially in that the clear width of the opening of passage is smaller than the cross-sectional dimension of the striking spot of the guide beam, and that in a further measuring surface at least one receiver element is arranged within the normal projection of the opening of passage, preferably in the axis or plane of symmetry of the opening of passage or symmetrically to these. By the fact that the clear width of the opening of passage is smaller than the cross-sectional dimension of the striking spot of the guide beam in this opening of passage, a first relatively simple control for the correct position results from the fact that light-sensitive elements give a signal at the edge of the opening of passage at the same time. When starting out from such a position the receiver is swivelled and the corresponding swivelling angle of the receiver is measured, the actual position of the tunnelling machine can be determined by the fact that a further signal occurs in the second posterior measuring surface if the receiver element be arranged in this further measuring surface in the axis or plane of symmetry of the opening of passage. In the simplest case three receiver elements are sufficient, by which simultaneous measuring of a signal in all of the three receiver elements with regard to the swivelling angle of the receiver gives a statement concerning the correct position of the tunnelling machine. The simultaneous occurrence of signals in three receiver elements is convertible into a signal for the correct position with a relatively simple logical circuit without the need of strenuous mathematical operations.

Preferably the device according to the invention has at least two receiver elements opposed to each other in relation to the axis or plane of symmetry in a distance which is smaller than the cross-sectional dimension of the striking spot of the guide beam. If deviations in the height direction be of secondary importance, two such receiver elements are sufficient in the measuring surface which has the opening of passage for the guide beam, in which angle of inclination and of gradient can be determined conventionally by a clinometer. For this purpose the receiver must be solely cross-sliding and swivelling about an axis which intersects the axis of the laser beam in order to obtain the signals required for correction. Swivelling of the device is granted preferably about an axis which is placed centrically within the opening of passage of the measuring surface located next to the emitter of the guide beam, so that the required adjusting for the receiver is reduced to a minimum.

The senistivity and precision of the statement achievable with such a simple device can be increased essentially if—as corresponds to a preferred embodiment of the device according to the invention—at least three measuring surfaces be arranged one behind the other in direction of propagation of the guide beam, in which at least two contiguous measuring surfaces have openings of passage. Also for this a simple logical circuit is sufficient for analysis and the following cases can for instance be distinguished. The guide beam gives in the first measuring surface only one signal of a receiver element to one side of the opening of passage, whereas in the following measuring surfaces no signals occur. In this case the receiver must be swivelled or slid until a signal occurs likewise at least in the second measuring surface, wherein this signal occurs for instance on that side of the opening of passage of the second surface which is opposed to the receiver element giving a signal to the first one. From such a combination of signals the direction of a required correction of the orientation of the receiver can be definitely gathered and a lateral sliding of the receiver as well as a further swivelling results finally in that position in which at least two receiver elements on both sides of the opening of passage in the first measuring surface and the receiver element in the last measuring surface give a signal at the same time. In this case no signal occurs in the receiver elements of the second measuring surface if the clear width of the opening of passage in the second surface be approximately the same as the clear width of the opening of passage in the first measuring surface, wherein the axis or longitudinal median plane of openings of passage arranged one behind the other must be in line with each other and coincide with the position of the receiver elements arranged centrically in the last measuring surface. The embodiment can be also effected so that the clear width of successive openings of passage in direction of propagation of the guide beam diminishes in the indicated direction. In this case an embodiment is possible in which the correct position results from the receiver elements on both sides of the opening of passage giving a signal simultaneously in each measuring surface as well as the receiver element(s) in the last measuring surface. The coincidence of such signals can be again determined with simple logical circuits. Preferably the receiver elements arranged within the measuring surfaces having an opening of passage are arranged at the edge of the opening of passage. Most simply, the opening of passage is shaped as a slot oriented in essentially vertical position wherein preferably a number of receiver elements is arranged in pairs parallel to the plane of symmetry of the slot. When the signals in longitudinal direction of the slot of superposed receiver elements are analyzed separately, an information concerning the height position of the machine results, wherein in at least three measuring surfaces also a statement about the angular position can be made. Such an angular statement for angles of inclination and gradient results when the signals in successive measuring surfaces occur in different height position, wherein again separate evaluation of the single receiver elements in the single surfaces is presupposed. Also several of such receiver elements which are superposed in height direction can be combined to groups, whereby a correct statement concerning the lateral deviations of the machine, particularly concerning inclination relatively to the required linear longitudinal axis is by no means impaired. In this case it is sufficient that the receiver elements on one side of the plane of symmetry of the slot are formed by the ends of light wave conductors, to the other ends of which a signal receiver common to several receiver elements is connected, whereby the expenditure of signal receivers and signal lines as well as of the logical circuit is essentially diminished.

A particularly high reliability in operation results from the arrangement of the single receiver elements being effected so that two neighbouring pairs of receiver elements which are opposed in relation to the slot, are arranged in a distance from each other so that a diagonal of the quadrangle formed by these receiver elements is smaller than the cross-sectional dimension of the spot of striking of the beam. In this case a position of the receiver which gives a single—valued statement in relation to the angular position relative to the linear longitudinal axis can be looked for in every position of inclination of the machine.

The device according to the invention represents thus a simple electronic view-finder, with which self-acting corrections of the deviation of the machine can be made possible particularly simply. The view-finder can be mounted in a box-molded housing elongated in height direction and can be shaped essentially smaller than corresponding mechanical view-finders.

The invention is subsequently explained more precisely with the aid of an embodiment described in the diagram. In this FIG. 1 shows a schematic lateral view of the device according to the invention, FIG. 2 a top viev in direction of arrow II of FIG. 1, FIG. 3 a sectional view following to line III—III of FIG. 1, FIG. 4 an analogous representation to FIG. 3 in swivelled position, FIG. 5 a view of a part of a measuring surface in direction of arrow V of FIG. 1, FIG. 6 an analogous representation to FIG. 5 in a modification of a measuring surface, FIG. 7 a basic circuit diagram for the analysis of the signals of the receiver elements, FIG. 8 a modification of the circuit diagram according to FIG. 7 and FIG. 9 a perspective view of a part of a further embodiment of a measuring surface.

Figure 1:
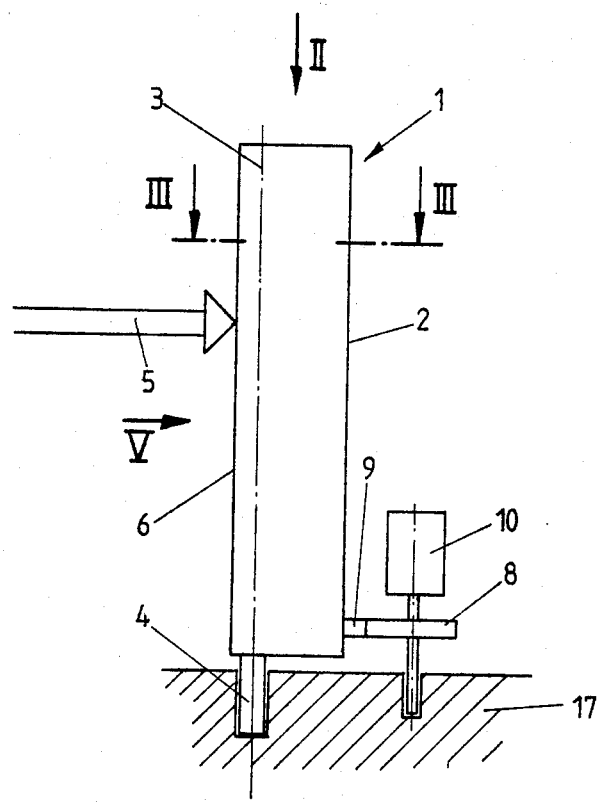
Figure 2:
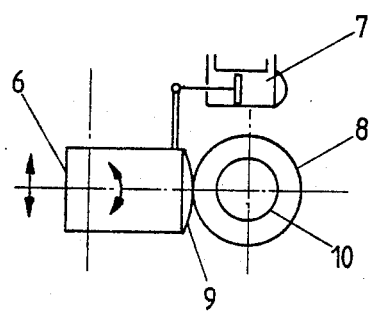

In FIG. 1 the housing of the device is marked with 1 and 2. Housing 2 is swivel-mounted, the pivot being marked with 4. The guide beam is indicated with 5 and strikes the elongated front surface 6, which is transmissive for the guide beam. The drive of the frame 2 at right angles to the axis of the machine can be effected by means of a (nonrepresented) hydraulic cylinder and a chain drive or by means of a hydro- or electro-motor and by a screwed spindle and nut. Pivot drive for swivelling about the axis 3 can be lead off a hydraulic cylinder 7, as is represented in FIG. 2, wherein a pinion 8 meshes with a segment of a pinion 9, by which the corresponding position of swivelling is picked off and can be sensed by an electrical position indicator 10. Conversely, the electrical position indicator 10 can be developed as a motor for the pivot drive, wherein the position of swivelling can be deduced from the position of the piston in the hydraulic cylinder 7. The function of the device is explained best with the aid of FIG. 3 and FIG. 4.

Figure 4:
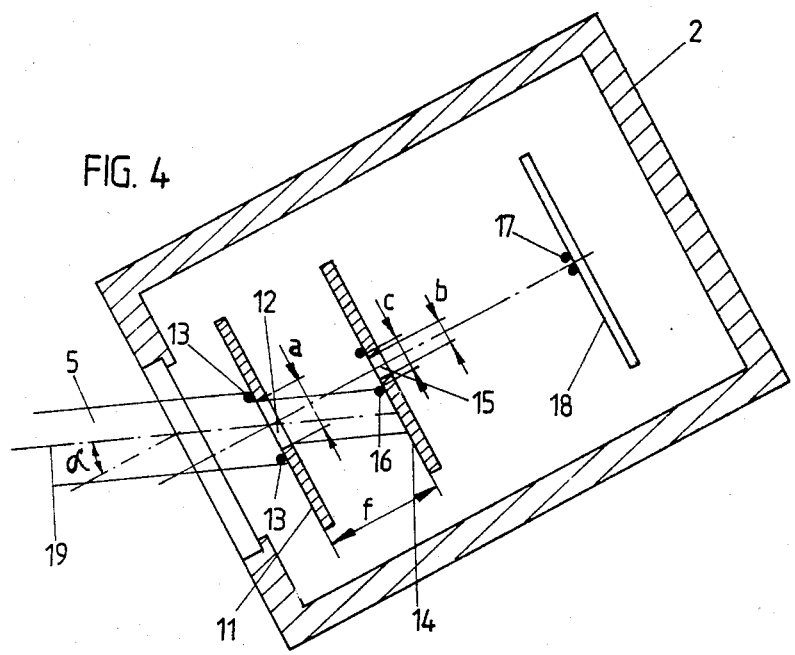
Figure 5:
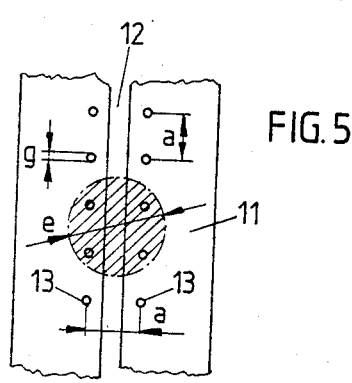

In FIG. 3 a guide beam 5 formed by a laser beam is indicated which passes a light-transmissive front wall 6 and strikes a first measuring surface 11. The first measuring surface 11 has an opening of passage formed by a slot 12 for the laser beam, at the edges of which light-sensitive elements 13 are arranged on both sides of the slot. Slot 12 forms a diaphragm for the guide beam formed by a laser beam and has a clear width a. In distance f behind the first measuring surface 11 a second measuring surface 14 is arranged, which has again an opening of passage formed by a slot 15 and on both sides of the opening of passage light-sensitive elements 16. The clear width b of the slot 15 is in this smaller than the clear width a of the slot 12 and the distance c of the light-sensitive element 16 is smaller than the clear width a of the slot 12 in the first measuring surface. If the housing 2 be correctly positioned the beam passing through the slots 12 and 15 strikes the light-sensitive element 17 of the third measuring surface 18. The housing 2 is swivelling about the axis 3 and this axis 3 is in the plane of the first measuring surface 11. The light-sensitive elements 13 of the first measuring surface 11 are in this arranged in a distance d on both sides of the slot 12, which is smaller than the diameter e of the spot of striking of the beam 5. In case of inclination of the machine guide beam 5 does not strike the light-sensitive elements of the third and last measuring surface 18 and must be aligned correspondingly by sliding and/or swivelling. Such a displacement is represented in FIG. 4. The axis 19 of the beam 5 penetrates already slot 12 of the first measuring surface 11, but strikes out of the slot 15 of the second measuring surface 14. In the displacement represented in FIG. 4 the both light-sensitive elements 13 of the first measuring surface 11 give already a signal, but only one light-sensitive element 16 on one side of slot 15 of the second measuring surface 14 will be able to give a signal. The third measuring surface 18 the beam does not strike and therefore no signal will occur in the light-sensitive element 17. In such a displacement the direction of the required swivelling of housing 2 about axis 3 results immediately in order to ensure that also in the second measuring surface 14 the light-sensitive elements on both sides of slot 15 are struck. As soon as this swivelling is achieved, the correct position results from the further occurrence of a signal in the third measuring surface 18. The distance f between the first and the second measuring surface 11 and 14 is chosen so that with a value of angular deviation α assumed or permissible as a maximum is just struck. This condition is complied with if this distance f be $f \leq (a)/(\sin \alpha)$.

By swivelling housing 2 about axis 3 the correct position can be taken and from the swivelling angle required for this the measured angle of displacement of the machine results immediately. The measuring surfaces 11 and 14 are herein shaped as slotted diaphragms with essentially vertical slot axis and the receiver elements represented in FIG. 3 and 4 in a plane of cross-section are arranged in pairs on both sides of the longitudinal median plane of the slots. This is explained more precisely in FIG. 5 and 6, in FIG. 5 being represented a measuring surface 11 which could be used as a measuring surface 14 as well. The diameters of the receiver elements are marked with g and the distance a in the direction at right angles to slot 12 measured so that the diameter e of the striking spot of the guide beam can admit to an opposed pair of receiver elements 13 each. In height direction of slot 12 a number of such receiver elements 13 are provided, wherein the distance of those receiver elements 13 successive in height direction is chosen again with a. In order to ensure that in each height position at least one pair of receiver elements 13 opposed to each other in relation to slot 12 can be admitted to by the guide beam, this distance a must be chosen so that the diagonal of the quadrangle formed by four neighbouring receiver elements 13 is smaller or equal to the diameter of the striking spot of the guide beam. With regard to the diameter g of the single receiver elements a results as $$a = \frac{e - g}{\sqrt{2}}.$$

Figure 6:
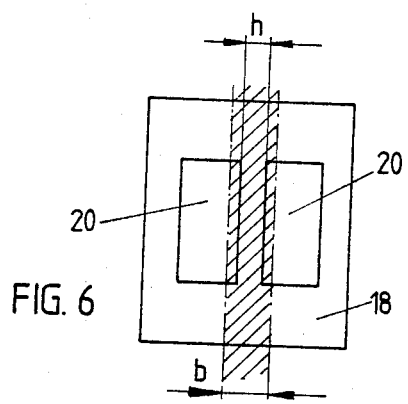

In case a distinction of single positions in height direction is not necessary, the receiver elements can be shaped as is represented in FIG. 6. Herein two elongated receiver elements 20 are arranged, which can be located on both sides of a slot. The embodiment according to FIG. 6 is favourable particularly for the third measuring surface 18, which the guide beam 5 with a clear width b corresponding to the width of the slot of the second measuring surface 14 located in front can strike. Between the measuring elements 20 a distance with breadth h is provided, which is smaller than the clear width b of the slotted diaphragm located in front of it. When both receiver elements 20 give a signal, the correct position of device 1 results from it. The receiver elements 20 are herein developed as double field sensor, the both receiver fields of which are located in a distance of several $\mu$m.

For detecting a vertical deviation of the machine it is sufficient to fit to the front face 6 a vertical scale when laser or light beams are used. Determination of the vertical deviation can be effected also by the superposed receiver elements 13 on one side of the slot 12 within the measuring surface 11 being analyzed separately, whereby the effort for analysis and the expenditure for the receiver elements are increased.

Figure 7:
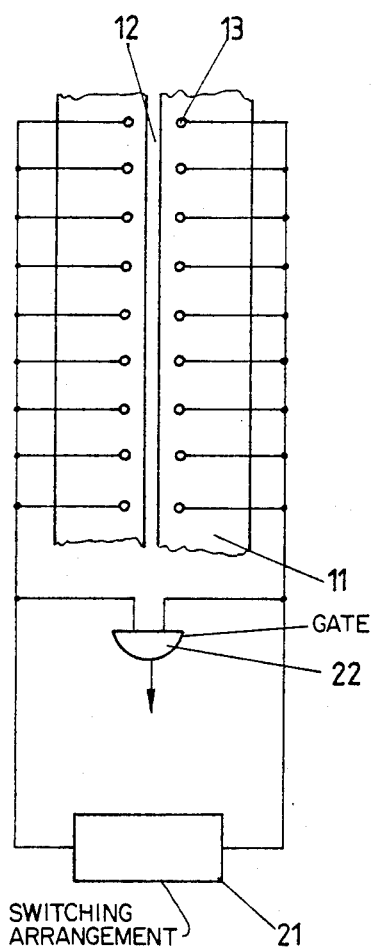
Figure 8:
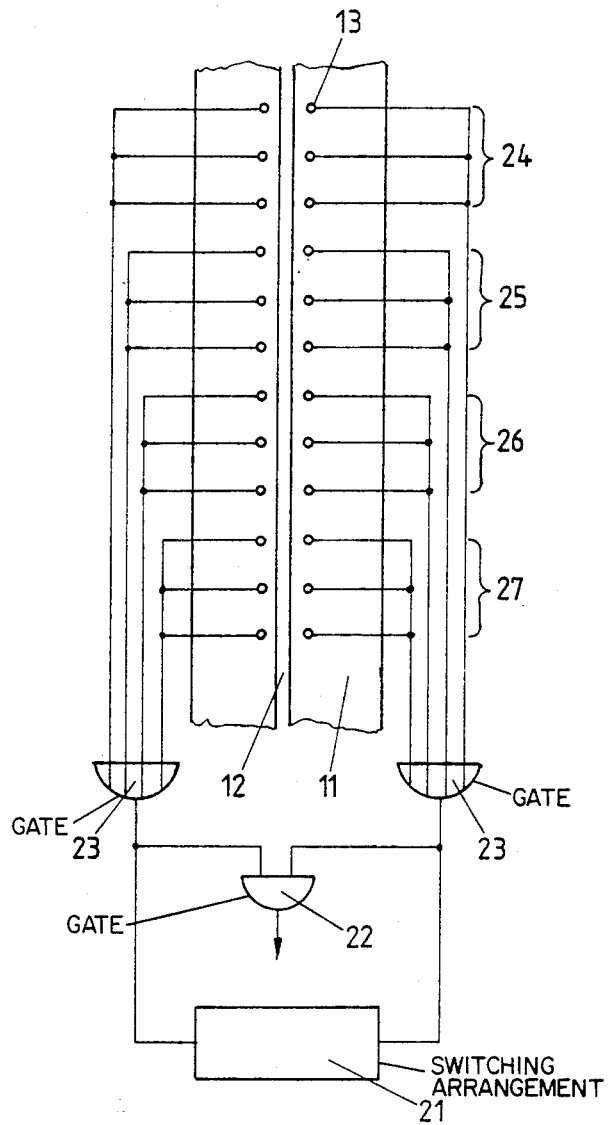

A schematically particularly simple analysis of the signals results in the representation according to FIG. 7 from signal lines of the receiver elements of each side of the measuring surfaces being conducted together to an analyzing circuit. For this case a switching arrangement 21 for determining the direction of the required correction and an AND - gate are provided. As soon as both lines of the receiver elements give a signal, correction can be stopped because of the AND - gate 22. When the receiver elements of a measuring surface 11 superposed in height position are grouped, as is represented in FIG. 8, further logical statements can be made. In the representation according to FIG. 8 three receiver elements 13 at a time superposed in vertical direction of the slot 12 are grouped and their signal lines conducted separately for both sides to an OR - gate 23. The rest of the switching arrangement with the AND - gate and the device for determining the required correction of direction 21 remains untouched herein. In vertical direction a gradual follow - up is made possible if the single signals of the superposed groups 24, 25, 26, and 27 are analyzed separately. When using a switching arrangement corresponding to FIG. 8 for two measuring surfaces 11 and 14 located one behind the other also a statement on the angle of deviation or gradient is possible, if the guide beam is admitted to another group of receiver elements in a measuring surface than in the following second measuring surface.

Figure 9:
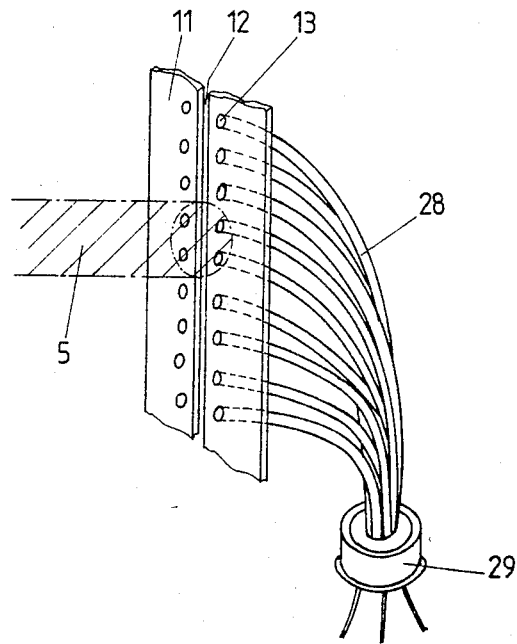

A particularly simple embodiment of a measuring surface 11 with which distinction in height direction is not possible though is represented in FIG. 9. The receiver elements 13 are herein formed by the free ends of light wave conductors 28 and a common signal receiver for the light wave conductors of the receiver elements 13 to one side of slot 11 is provided. Such an embodiment according to FIG. 9 can be used for all measuring surfaces, doing without analysis in height direction. Such light wave conductors 28 offer the advantage that they can have a very small diameter and this can be of great significance for the exactness especially in the third measuring surface. Light wave conductors can also be placed very exactly in drill holes.

What is claimed is:

1. In apparatus for controlling the position of a tunnelling machine in relation to a guide beam having a preselected cross-sectional dimension comprising: an orientable receiver for receiving the guide beam through a wall thereof; a first measuring surface disposed vertically within the receiver, said first surface having a vertical slot therein for transmitting part of the beam, the width of said slot being less than the cross-sectional dimension of said beam; two pairs of first beam-receiver elements located on opposite sides of said slot and horizontally spaced apart a distance less the cross-sectional dimension of said beam, the receiver elements being vertically spaced apart such that the two pairs define a quadrangle and such that a diagonal of the quadrangle is less than the cross-sectional dimension of said beam; a further measuring surface arranged behind said first measuring surface to receive the beam transmitted through said slot, said further measuring surface having a vertical slot therein, of lesser width than the slot in said first surface, for transmitting part of the beam received by said second surface, a pair of second beam-receiver elements located on opposite sides of the slot in said second surface and spaced apart a distance less than the width of the slot in said first measuring surface.

2. Apparatus as in claim 1 including a third measuring surface behind said second measuring surface for receiving the beam which passes through the slot in said second measuring surface.

3. Apparatus as in claim 1 wherein said receiver elements are located at the edges of their respective slots.

4. Apparatus as in claim 1 wherein the beam-receiver elements located on one slide of the slot in the first measuring surface are formed by the ends of light wave conductors, said conductors having opposite ends connected to a signal receiver.

5. Apparatus as in claim 1 wherein said receiver is mounted for swivelling movement about a vertical axis which passes centrally through the slot in said measuring surface.

* * * * *